(12) United States Patent
Chavez et al.

(10) Patent No.: US 9,134,556 B2
(45) Date of Patent: Sep. 15, 2015

(54) LIQUID CRYSTAL VARIABLE DRIVE VOLTAGE

(71) Applicant: zSpace, Inc., Sunnyvale, CA (US)

(72) Inventors: David A. Chavez, San Jose, CA (US); Michael A. Cheponis, Santa Clara, CA (US); Mark F. Flynn, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 14/335,708

(22) Filed: Jul. 18, 2014

(65) Prior Publication Data

US 2014/0327850 A1 Nov. 6, 2014

Related U.S. Application Data

(63) Continuation of application No. 13/110,562, filed on May 18, 2011, now Pat. No. 8,786,529.

(51) Int. Cl.
*G09G 3/36* (2006.01)
*G09G 3/38* (2006.01)
*G02F 1/133* (2006.01)

(52) U.S. Cl.
CPC ............. *G02F 1/13306* (2013.01); *G09G 3/36* (2013.01)

(58) Field of Classification Search
USPC ................................ 345/87, 204, 88, 89, 690
See application file for complete search history.

(56) References Cited

U.S. PATENT DOCUMENTS

| | | | |
|---|---|---|---|
| 1,592,034 A | 7/1926 | Macy | |
| 4,182,053 A | 1/1980 | Allen | |
| 4,291,380 A | 9/1981 | Rohner | |
| 4,677,576 A | 6/1987 | Berlin | |
| 4,763,280 A | 8/1988 | Robinson | |
| 4,795,248 A | 1/1989 | Okada | |
| 4,984,179 A | 1/1991 | Waldern | |
| 5,079,699 A | 1/1992 | Tuy | |
| 5,168,531 A | 12/1992 | Sigel | |

(Continued)

FOREIGN PATENT DOCUMENTS

GB 2396421 6/2004

OTHER PUBLICATIONS

Agrawala, et al. "The Two-User Responsive Workbench: Support for Collaboration Through Individual Views of a Shared Space"; Proceedings of the 24th Annual Conference on Computer Graphics and Interactive Techniques; 1997 (6 pages).

(Continued)

*Primary Examiner* — Grant Sitta
(74) *Attorney, Agent, or Firm* — Meyertons Hood Kivlin Kowert & Goetzel, P.C.; Jeffrey C. Hood; Brian E. Moore

(57) ABSTRACT

A voltage may be provided to a liquid crystal addressable element as part of a liquid crystal device. The provided voltage may be reduced from a driven state to a relaxed state in a time period greater than 1 µs. The reduction may further be performed in less than 20 ms. The liquid crystal device may be a polarization switch, which in some embodiments may be a multi-segment polarization switch. In one embodiment, pulses of limited duration of a light source may be provided to the polarization switch. The manner of voltage reduction may reduce optical bounce of the liquid crystal device and may allow one or more of the pulses of the light source to be shifted later in time.

20 Claims, 11 Drawing Sheets

(56) References Cited

U.S. PATENT DOCUMENTS

| | | |
|---|---|---|
| 5,237,647 A | 8/1993 | Roberts |
| 5,264,964 A | 11/1993 | Faris |
| 5,276,785 A | 1/1994 | Mackinlay |
| 5,287,437 A | 2/1994 | Deering |
| 5,327,285 A | 7/1994 | Faris |
| 5,361,386 A | 11/1994 | Watkins |
| 5,381,127 A | 1/1995 | Khieu |
| 5,381,158 A | 1/1995 | Takahara |
| 5,400,177 A | 3/1995 | Petitto |
| 5,438,623 A | 8/1995 | Begault |
| 5,515,079 A | 5/1996 | Hauck |
| 5,537,144 A | 7/1996 | Faris |
| 5,559,937 A | 9/1996 | Takeda |
| 5,574,835 A | 11/1996 | Duluk |
| 5,574,836 A | 11/1996 | Broemmelsiek |
| 5,652,617 A | 7/1997 | Barbour |
| 5,659,969 A | 8/1997 | Butler |
| 5,686,975 A | 11/1997 | Lipton |
| 5,696,892 A | 12/1997 | Redmann |
| 5,745,164 A | 4/1998 | Faris |
| 5,795,154 A | 8/1998 | Woods |
| 5,844,717 A | 12/1998 | Faris |
| 5,862,229 A | 1/1999 | Shimizu |
| 5,880,733 A | 3/1999 | Horvitz |
| 5,880,883 A | 3/1999 | Sudo |
| 5,945,985 A | 8/1999 | Babin |
| 5,956,046 A | 9/1999 | Kehlet |
| 6,028,593 A | 2/2000 | Rosenberg |
| 6,034,717 A | 3/2000 | Dentinger |
| 6,064,354 A | 5/2000 | DeLuca |
| 6,069,649 A | 5/2000 | Hattori |
| 6,072,495 A | 6/2000 | Watanabe |
| 6,100,903 A | 8/2000 | Goettsche |
| 6,108,005 A | 8/2000 | Starks |
| 6,115,022 A | 9/2000 | Mayer |
| 6,125,337 A | 9/2000 | Rosenberg |
| 6,134,506 A | 10/2000 | Rosenberg |
| 6,139,434 A | 10/2000 | Miyamoto |
| 6,163,336 A | 12/2000 | Richards |
| 6,195,205 B1 | 2/2001 | Faris |
| 6,198,524 B1 | 3/2001 | Osgood |
| 6,208,346 B1 | 3/2001 | Washio |
| 6,211,848 B1 | 4/2001 | Plesniak |
| 6,226,008 B1 | 5/2001 | Watanabe |
| 6,241,609 B1 | 6/2001 | Rutgers |
| 6,252,707 B1 | 6/2001 | Kleinberger |
| 6,317,127 B1 | 11/2001 | Daily |
| 6,346,938 B1 | 2/2002 | Chan |
| 6,351,280 B1 | 2/2002 | Benton |
| 6,373,482 B1 | 4/2002 | Migdel |
| 6,384,971 B1 | 5/2002 | Faris |
| 6,392,689 B1 | 5/2002 | Dolgoff |
| 6,431,705 B1 | 8/2002 | Linden |
| 6,452,593 B1 | 9/2002 | Challener |
| 6,478,432 B1 | 11/2002 | Dyner |
| 6,483,499 B1 | 11/2002 | Li |
| 6,529,210 B1 | 3/2003 | Rees |
| 6,556,197 B1 | 4/2003 | Van Hook |
| 6,593,924 B1 | 7/2003 | Lake |
| 6,614,427 B1 | 9/2003 | Aubrey |
| 6,618,049 B1 | 9/2003 | Hansen |
| 6,643,124 B1 | 11/2003 | Wilk |
| 6,680,735 B1 | 1/2004 | Seiler |
| 6,690,337 B1 | 2/2004 | Mayer |
| 6,715,620 B2 | 4/2004 | Taschek |
| 6,734,847 B1 | 5/2004 | Baldeweg |
| 6,753,847 B2 | 6/2004 | Kurtenbach |
| 6,827,446 B2 | 12/2004 | Beckett |
| 6,882,953 B2 | 4/2005 | D'Hooge |
| 6,898,307 B1 | 5/2005 | Harrington |
| 6,912,490 B2 | 6/2005 | Dodge |
| 6,943,754 B2 | 9/2005 | Aughey |
| 6,956,576 B1 | 10/2005 | Deering |
| 6,987,512 B2 | 1/2006 | Robertson |
| 7,102,635 B2 | 9/2006 | Shih |
| 7,161,615 B2 | 1/2007 | Pretzer |
| 7,236,618 B1 | 6/2007 | Chui |
| 7,249,952 B2 | 7/2007 | Ranta |
| 7,321,682 B2 | 1/2008 | Tooyama |
| 7,353,134 B2 | 4/2008 | Cirielli |
| 7,477,232 B2 | 1/2009 | Serra |
| 7,492,986 B1 | 2/2009 | Kelly |
| 7,583,252 B2 | 9/2009 | Kurtenbach |
| 8,482,506 B2 * | 7/2013 | Kwok et al. .................. 345/102 |
| 2001/0033327 A1 | 10/2001 | Uomori |
| 2002/0008906 A1 | 1/2002 | Tomita |
| 2002/0041327 A1 | 4/2002 | Hildreth |
| 2002/0080094 A1 | 6/2002 | Biocca |
| 2002/0113752 A1 | 8/2002 | Sullivan |
| 2002/0140698 A1 | 10/2002 | Robertson |
| 2002/0163482 A1 | 11/2002 | Sullivan |
| 2002/0174121 A1 | 11/2002 | Clemie |
| 2002/0176636 A1 | 11/2002 | Shefi |
| 2002/0180727 A1 | 12/2002 | Guckenberger |
| 2002/0186221 A1 | 12/2002 | Bell |
| 2002/0190961 A1 | 12/2002 | Chen |
| 2003/0006943 A1 | 1/2003 | Sato |
| 2003/0011535 A1 | 1/2003 | Kikuchi |
| 2003/0085866 A1 | 5/2003 | Bimber |
| 2003/0085896 A1 | 5/2003 | Freeman |
| 2003/0112328 A1 | 6/2003 | Yoon |
| 2003/0117396 A1 | 6/2003 | Yoon |
| 2003/0206653 A1 | 11/2003 | Katayama |
| 2003/0227470 A1 | 12/2003 | Genc |
| 2003/0231177 A1 | 12/2003 | Montagnese |
| 2004/0037459 A1 | 2/2004 | Dodge |
| 2004/0066376 A1 | 4/2004 | Donath |
| 2004/0066384 A1 | 4/2004 | Ohba |
| 2004/0125103 A1 | 7/2004 | Kaufman |
| 2004/0130525 A1 | 7/2004 | Suchocki |
| 2004/0135744 A1 | 7/2004 | Bimber |
| 2004/0135780 A1 | 7/2004 | Nims |
| 2004/0164956 A1 | 8/2004 | Yamaguchi |
| 2004/0169649 A1 | 9/2004 | Suzuki |
| 2004/0169670 A1 | 9/2004 | Uehara |
| 2004/0196359 A1 | 10/2004 | Blackham |
| 2004/0208358 A1 | 10/2004 | Tooyama |
| 2004/0227703 A1 | 11/2004 | Lamvik |
| 2004/0249303 A1 | 12/2004 | Serra |
| 2005/0024331 A1 | 2/2005 | Berkley |
| 2005/0030308 A1 | 2/2005 | Takaki |
| 2005/0057579 A1 | 3/2005 | Young |
| 2005/0093859 A1 | 5/2005 | Sumanaweera |
| 2005/0093876 A1 | 5/2005 | Snyder |
| 2005/0151742 A1 | 7/2005 | Hong |
| 2005/0156881 A1 | 7/2005 | Trent |
| 2005/0162447 A1 | 7/2005 | Tigges |
| 2005/0195276 A1 | 9/2005 | Lipton |
| 2005/0219240 A1 | 10/2005 | Vesely |
| 2005/0219693 A1 | 10/2005 | Hartkop |
| 2005/0219694 A1 | 10/2005 | Vesely |
| 2005/0219695 A1 | 10/2005 | Vesely |
| 2005/0231532 A1 | 10/2005 | Suzuki |
| 2005/0248566 A1 | 11/2005 | Vesely |
| 2005/0264558 A1 | 12/2005 | Vesely |
| 2005/0264559 A1 | 12/2005 | Vesely |
| 2005/0264651 A1 | 12/2005 | Saishu |
| 2005/0264857 A1 | 12/2005 | Vesely |
| 2005/0264858 A1 | 12/2005 | Vesely |
| 2005/0275913 A1 | 12/2005 | Vesely |
| 2005/0275914 A1 | 12/2005 | Vesely |
| 2005/0275915 A1 | 12/2005 | Vesely |
| 2005/0281411 A1 | 12/2005 | Vesely |
| 2006/0126926 A1 | 6/2006 | Vesely |
| 2006/0126927 A1 | 6/2006 | Vesely |
| 2006/0170652 A1 | 8/2006 | Bannai |
| 2006/0221071 A1 | 10/2006 | Vesely |
| 2006/0227151 A1 | 10/2006 | Bannai |
| 2006/0250390 A1 | 11/2006 | Vesely |
| 2006/0250391 A1 | 11/2006 | Vesely |
| 2006/0250392 A1 | 11/2006 | Vesely |
| 2006/0252978 A1 | 11/2006 | Vesely |
| 2006/0252979 A1 | 11/2006 | Vesely |
| 2007/0035511 A1 | 2/2007 | Banerjee |

(56) References Cited

U.S. PATENT DOCUMENTS

| | | | |
|---|---|---|---|
| 2007/0040905 A1 | 2/2007 | Vesely | |
| 2007/0043466 A1 | 2/2007 | Vesely | |
| 2007/0109296 A1 | 5/2007 | Sakagawa | |
| 2007/0229951 A1 | 10/2007 | Jung | |
| 2007/0279541 A1* | 12/2007 | Mochizuki et al. | 349/36 |
| 2008/0087378 A1 | 4/2008 | Washburn | |
| 2008/0225187 A1 | 9/2008 | Yamanaka | |
| 2008/0239176 A1 | 10/2008 | Shestak | |

OTHER PUBLICATIONS

Arvo, "Responsive Workbench: Algorithms and Methodologies"; California Institute of Technology; Aug. 1998; Retrieved from the Internet: <http://www.gg.caltech.edu/workbench/intro.html> (4 pages).
Beardsley, Important Concepts from Projective Geometry; University of Edinburgh; Jan. 1995 (16 pages).
Cutler, et al. "Two-Handed Direct Manipulation on the Responsive Workbench"; Proceedings of the 1997 Symposium on Interactive 3D Graphics, ACM; 1997 (9 pages).
Frohlich, et al. "Physically-Based Manipulation on the Responsive Workbench"; Proceedings, IEEE, Jan. 2000 (7 pages).
Frohlich, et al. "The Responsive Workbench: A Virtual Working Environment for Physicians"; Computers in Biology and Medicine, Elsevier Science, Mar. 1995, vol. 25, No. 2; pp. 301-308 (8 pages).
Frohlich, (stills from video) "Physically-based Manipulation on the Responsive Workbench"; Stanford University, Jan. 2000 (2 pages).
Girling; "Stereoscopic Drawings: A Theory of 3-D Vision and Its Application to Stereoscopic Drawing"; 1990, Free Standing Projection, Chap. 2 (12 pages).
Hanrahan, et al. "The Responsive Workbench"; Stanford University, Nov. 1996 (23 pages).
Hughes; "An Introduction to Making Phantograms"; Jul. 7-12, 2004 (60 pages).
International Search Report for Application No. PCT/US2005/11252, mailed May 30, 2006 (11 pages).
International Search Report for Application No. PCT/US2005/11253, mailed Jun. 2, 2006 (9 pages).
International Search Report for Application No. PCT/US2005/11254, mailed Mar. 26, 2007 (10 pages).
International Search Report for Application No. PCT/US2005/11255, mailed Mar. 2, 2006 (9 pages).
International Search Report for Application No. PCT/US2005/19068, mailed Feb. 27, 2006 (8 pages).
International Search Report for Application No. PCT/US2005/19069, mailed Feb. 22, 2006 (9 pages).
International Search Report for Application No. PCT/US2005/47659, mailed Dec. 4, 2006 (6 pages).
International Search Report for Application No. PCT/US2006/17596, mailed Nov. 28, 2006 (11 pages).
International Search Report for Application No. PCT/US2006/17598, mailed Apr. 26, 2007 (8 pages).
Vesely, "Aspects of the IZ User Interface Shown in Prior Demos"; Infinite Z, 2003 (10 pages).
U.S. Appl. No. 11/724,523, entitled "Horizontal Perspective Polarizing Media", by Michael A. Vesely and Nancy L. Clemens, filed on Mar. 14, 2007 (42 pages).
U.S. Appl. No. 11/724,524, entitled "Shifted Pixel Polarized Stereoscopic Display", by Michael A. Vesely and Nancy L. Clemens, filed on Mar. 14, 2007 (45 pages).
U.S. Appl. No. 11/724,525, entitled "Composite Pointer for Stereoscopic Simulation", by Michael A. Vesely and Nancy L. Clemens, filed on Mar. 14, 2007 (27 pages).
International Search Report for Application No. PCT/US2006/17597, mailed Sep. 20, 2006 (7 pages).
Bares, et al. "Virtual 3D Camera Composition from Frame Contraints"; University of Louisiana at Layfayette; 2000 (10 pages).
Official Action mailed Feb. 23, 2007 for U.S. Appl. No. 11/141,650 (10 pages).
Official Action mailed Aug. 20, 2007 for U.S. Appl. No. 11/141,650 (22 pages).
Berezin, et al. "Electrooptic switching in oriented liquid-cyrstal films," American Institute of Physics, 1973, pp. 78-79 (2 pages).
Berman, "Basics of Stereoscopic Displays," Analyst, Insight Media, Dec. 2, 2008 (84 pages).
Berreman, "Liquid-crystal twist cell dynamics with backflow," Journal of Applied Physics, vol. 46, No. 9, Sep. 1975, pp. 3746-3751 (5 pages).
Chen, et al. "Dynamics of twisted nematic liquid crystal pi-cells," Applied Physics Letters, vol. 80, No. 20, May 20, 2002, pp. 3721-3723 (3 pages).
Chen, et al. "Homeotropic liquid-crystal device with two metastable states," Applied Physics Letters, vol. 74, No. 25, Jun. 21, 1999, pp. 3779-3781 (3 pages).
Chen, et al. "The Optical Bounce Effect of the Chiral-Homeotropic Cell," ASID 1999, pp. 171-175 (5 pages).
Hubbard, et al. "Optical-Bounce Removal and Turnoff-Time Reduction in Twisted-Nematic Displays," IEEE, 1981 (3 pages).
Jhun, et al. "Optical Bouncing in Bistable Chiral Splay Nematic Liquid Crystal Device," Japanese Journal of Applied Physics, vol. 45, No. 1A, 2006, pp. 128-132 (5 pages).
Kelly, et al., "Simulation of the dynamics of twisted nematic devices including flow," Journal of Applied Physics, vol. 86, No. 8, Oct. 15, 1999, pp. 4091-4095 (5 pages).
Kim, et al., "Numerical analysis on the dynamical behavior of the TN and OCB modes including flow," Proc. of ASID'06, Oct. 8-12, pp. 179-182 (4 pages).
Kwok, et al., "Optical Properties of Bistable Twisted Nematic LCD and Its Switching Mechanisms," Centre for Display Research, Hong Kong University of Science and Technology, 1997 (4 pages).
Lu, et al., "Variable optical attenuator based on polymer stabilized twisted nematic liquid crystal," Optics Express, vol. 12, No. 7, Apr. 5, 2004, pp. 1221-1227 (7 pages).
Nicholson, et al., "Dynamic Response of Twisted Nematic Liquid Crystal Cells to Transiently Pulsed Fields," Optic Communications, vol. 40, No. 4, Jan. 15, 1982, pp. 283-287 (5 pages).
Qian, et al., "Dynamic flow and switching bistability in twisted nematic liquid crystal cells," Applied Physics Letters, vol. 71, No. 5, Aug. 4, 1997, pp. 596-598 (3 pages).
Smith, et al., "Direct Optical Quantification of Backflow in a 90 degree Twisted Nematic Cell," Physical Review Letters, vol. 88, No. 8, Feb. 25, 2002 4 pages).
Van Sprang, et al., "Experimental and calculated results for the dynamics of oriented nematics with twist angles from 210 degrees to 270 degrees," Journal of Applied Physics, vol. 64, No. 10, Nov. 15, 1988, pp. 4873-4883 (11 pages).
Wang, et al., "Bistable Twist Nematic Display d/p Ratio Optimization," Liquid Crystal Institute, Kent State University, Kent, Ohio, US (6 pages).
Xie, et al., "Reflective Bistable Twisted Nematic Liquid Crystal Display," Journal of Applied Physics, vol. 37 Pt.1, No. 5A, 1998, pp. 2572-2575 (3 pages).

* cited by examiner

LIQUID CRYSTAL VARIABLE DRIVE VOLTAGE

PRIORITY INFORMATION

This application is a Continuation of U.S. patent application Ser. No. 13/110,562, filed on May 18, 2011, titled "Liquid Crystal Variable Drive Voltage," whose inventors are David A. Chavez, Michael A. Cheponis, and Mark F. Flynn, which is hereby incorporated by reference in its entirety as though fully and completely set forth herein.

TECHNICAL FIELD

This disclosure relates to the field of liquid crystal devices such as LCD displays, and more particularly to driving liquid crystals.

DESCRIPTION OF THE RELATED ART

Polarization switches may be utilized in conjunction with a light source to control how much light is transmitted to the display at a given time. Specifically, polarization switches may include liquid crystals (LCs) that twist and rotate in response to a voltage, thereby affecting light transmittance. Transitioning an LC from a driven voltage state to the relaxed voltage state may create an optical bounce that may result in a bounce of the optical characteristics of the LCD device as it transitions from its black normal or white normal state. FIG. 1A shows typical optical responses (luminance versus time) for a twisted nematic (TN) polarization switch at 5V and 10V. The increase in luminance after time zero represents the transition of the polarization switch (and the LCs) from the driven voltage state to the relaxed voltage state. FIG. 1B is a zoomed in view of the 5V and 10V optical responses of FIG. 1A. Note the pronounced optical bounce in the 10V response—the curve initially begins to rise, drops, then rises again. Such a bounce may cause a PS to suffer delay (about 1-2 ms), and may introduce unwanted optical effects. The degraded performance may affect both two-dimensional (2D) and three-dimensional (3D) displays. The effects of optical bounce may be more pronounced in 3D displays, which produce frames that alternate between left and right eye frames.

SUMMARY OF THE DISCLOSURE

Various embodiments described herein relate to techniques and structures that facilitate a liquid crystal variable drive voltage. In one embodiment, a voltage may be provided to a liquid crystal addressable element of a liquid crystal device, such as a polarization switch. The provided voltage may be at a driven voltage level. The provided voltage may be reduced to a relaxed voltage level over a time period greater than 1 µs. At the relaxed level, the polarization switch may be in a relaxed state. The voltage reduction may be performed in less than 20 ms. In one embodiment, pulses of limited duration of a light source may be provided to the polarization switch. The voltage reduction may result in a reduced optical bounce of the liquid crystal device. Such a voltage reduction may also allow one or more of the pulses of the light source to be shifted later in time.

In one non-limiting example, the polarization switch may be a multi-segment polarization switch. The provided voltage may be independently driven to provide each segment of the polarization switch with an independent, time-shifted voltage in relation to the independently driven voltages that are provided to each other segment. The light source may likewise be segmented such that subsidiary pulses of a pulse may be provided to corresponding segments of the polarization switch.

BRIEF DESCRIPTION OF THE DRAWINGS

A better understanding of the present disclosure can be obtained when the following detailed description is considered in conjunction with the following drawings.

Figure 1A:
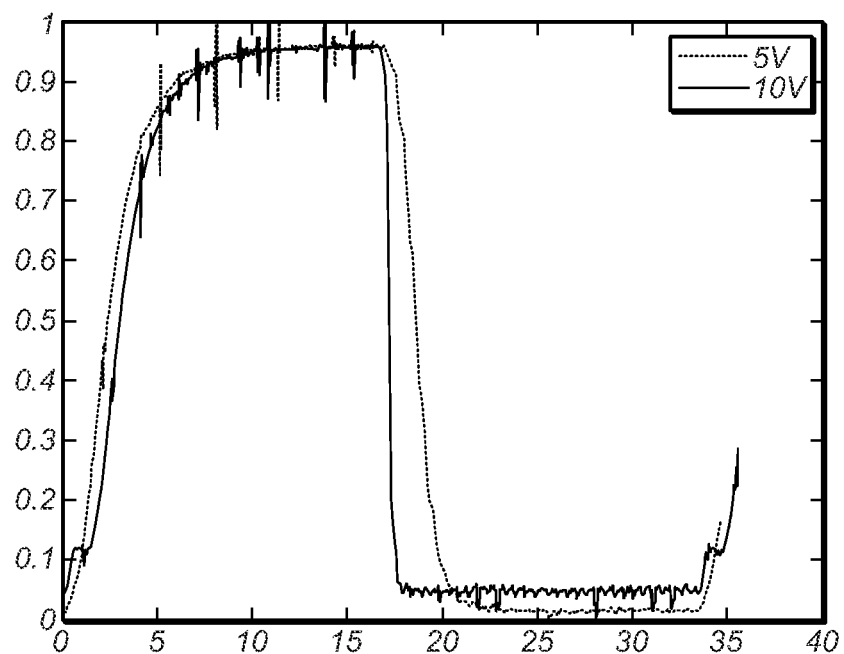
FIGS. 1A and 1B illustrate typical optical responses for a twisted nematic polarization switch at 5V and 10V.
Figure 1B:
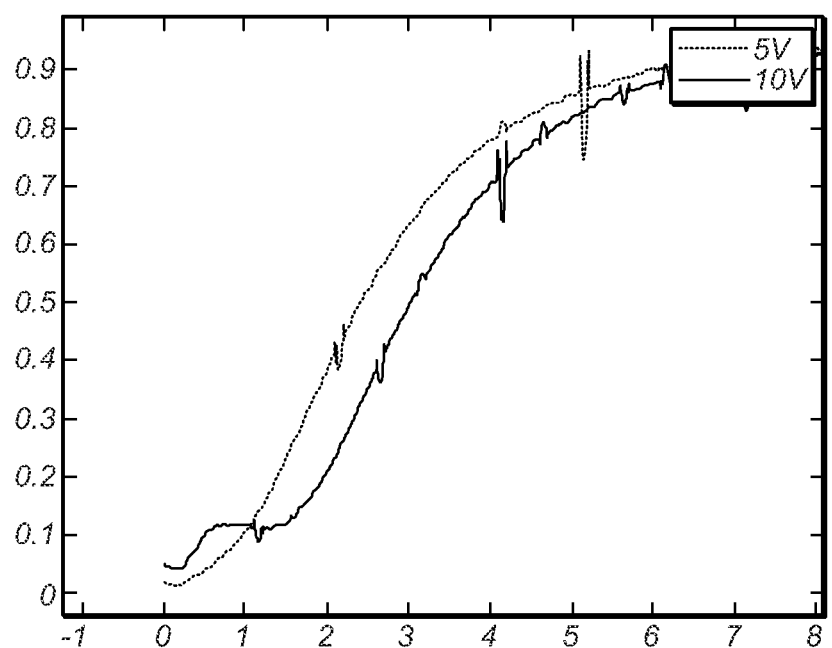

While the disclosure is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Storage Medium—a storage medium may include any non-transitory/tangible storage media readable by a computer/processor to provide instructions and/or data to the computer/processor. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Carrier Medium—a storage medium as described above, as well as a physical transmission medium, such as a bus, network, and/or other physical transmission medium that conveys signals such as electrical, electromagnetic, or digital signals.

LC Device—an electro-optical device that uses an LC material to manipulate light by the application of a voltage.

LC Light Modulator—an LC device that manipulates the intensity of light passing through it. An example of a type of LC Light Modulator is an LCD, which may be pixelated.

Polarization Switch (PS)—an LC device that manipulates the polarization of light passing through it. Note that the PS does not generally change the intensity of light on its own. It may typically be accomplished when the PS is used in conjunction with an analyzer. An analyzer may be a polarizer that is used to block or pass some predetermined polarization state. For example, an LCD typically has a polarizer on the input side and a polarizer on the output side. The output polarizer is called an analyzer. Eyewear may act as an analyzer in some embodiments.

PS Segment—a segment of a PS that is independently controllable.

Pixel—an individually addressable element of an LCD.

LC Cell or LC Layer—the layer of LC material enclosed by the top and bottom substrates of an LC device.

LC Mode—the LC design used in an LC device. The design may include the specific type of LC material, the thickness of the cell, the orientation of the alignment directions, etc. Typical LC modes include TN, VA (vertical alignment), IPS (In Plane Switching), etc.

Driven State—the term driven state may refer to the high voltage state of an LC (e.g., +/−10 V, +/−12 V, etc.). As an example using a Twisted Nematic (TN) liquid crystal device, the driven state of the LC may correspond to the position and orientation of the LC such that the LC rotates the polarization of polarized light entering the liquid crystal device from the non-driven state in a manner that the polarization of the incoming light equals the polarization of the outgoing light.

Relaxed State—the term relaxed state may refer to the low voltage state of an LC (e.g., 0 V). As an example using a TN liquid crystal device, the relaxed state of the LC may correspond to the position and orientation of the LC such that the polarized light entering the LC rotates the polarization.

Frame Time—the period that contains one driven state and one relaxed state. The frame time may include two frames worth of data. For example, in a 3D system that alternates between left and right eye frames, a frame time may include one left eye frame and one right eye frame.

Normal White—corresponds to a white optical state at 0V. Thus, normal white corresponds to a normally high luminance state at 0V where light is transmitted through a polarization switch (and LCs). One example of a normal white polarization switch includes 90° twisted nematic liquid crystals. In context of an embodiment using the polarization switch and corresponding eyewear, where the two lenses of the two eyepieces of the eyewear are cross polarized, normal white means that, at the relaxed state of the PS, the lens that is at same polarization to the PS at the relaxed state is normally white (i.e. light passing through the PS is seen through normal white lens.)

Normal Black—corresponds to a black optical state at 0V. Thus, if no voltage is applied, light may not be transmitted through a polarization switch (and LCs). A PS may be used in both a normal black and normal white mode simultaneously. For example, in a 3D system that alternates between left and right eye images, one eye may be the normal black eye and the other may be the normal white eye. Eyewear (e.g., passive eyewear or shutter glasses) may be used in conjunction with such a system. In context of an embodiment using the polarization switch and corresponding eyewear, where the two lenses of the two eyepieces of the eyewear are cross polarized, normal black means that, at the driven state of the PS, the lens that is at same polarization to the PS at the driven state is normally black (i.e. light passing through the PS is seen through normal black lens.)

Optical Bounce—A temporary increase or decrease in the optical response of an LC device due to backflow effect in certain LC configurations. The optical bounce may appear as an oscillation in the transmission-time curve after an electric or magnetic field has been removed from an LC cell. Therefore, optical bounce may include a delay in reaching the relaxed state and an unintended optical effect as well. The optical effect may result in light leakage in the white normal state and a drop in luminance in the black normal state.

Comprising—this term is open-ended. As used in the appended claims, this term does not foreclose additional structure or steps. Consider a claim that recites: "An apparatus comprising a liquid crystal display . . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a liquid crystal display system having a light source generating light pulses, the terms "first" and "second" pulses of a light source can be used to refer to any two pulses. In other words, the "first" and "second" pulses are not limited to logical instances 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 2A:
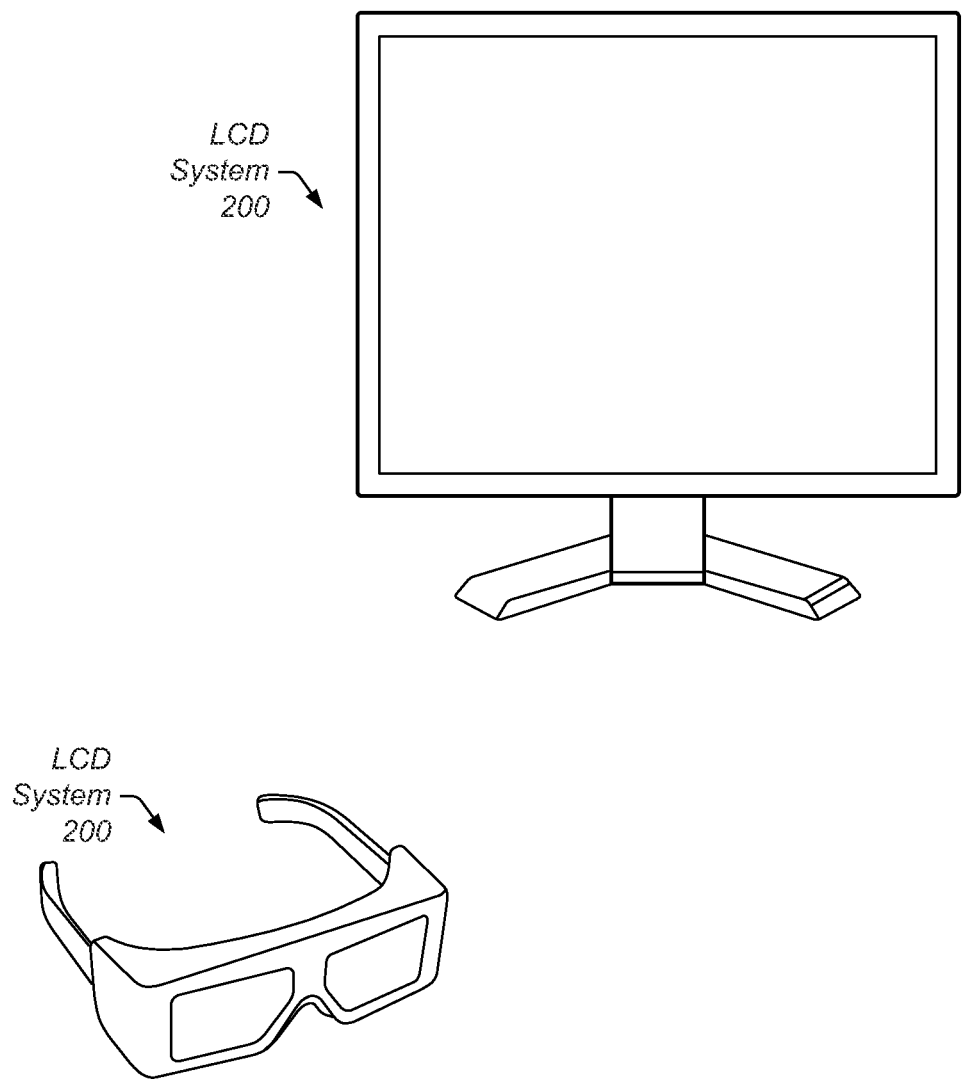
FIGS. 2A and 2B illustrate example liquid crystal systems that may incorporate a variable drive voltage, according to some embodiments.
Figure 2B:
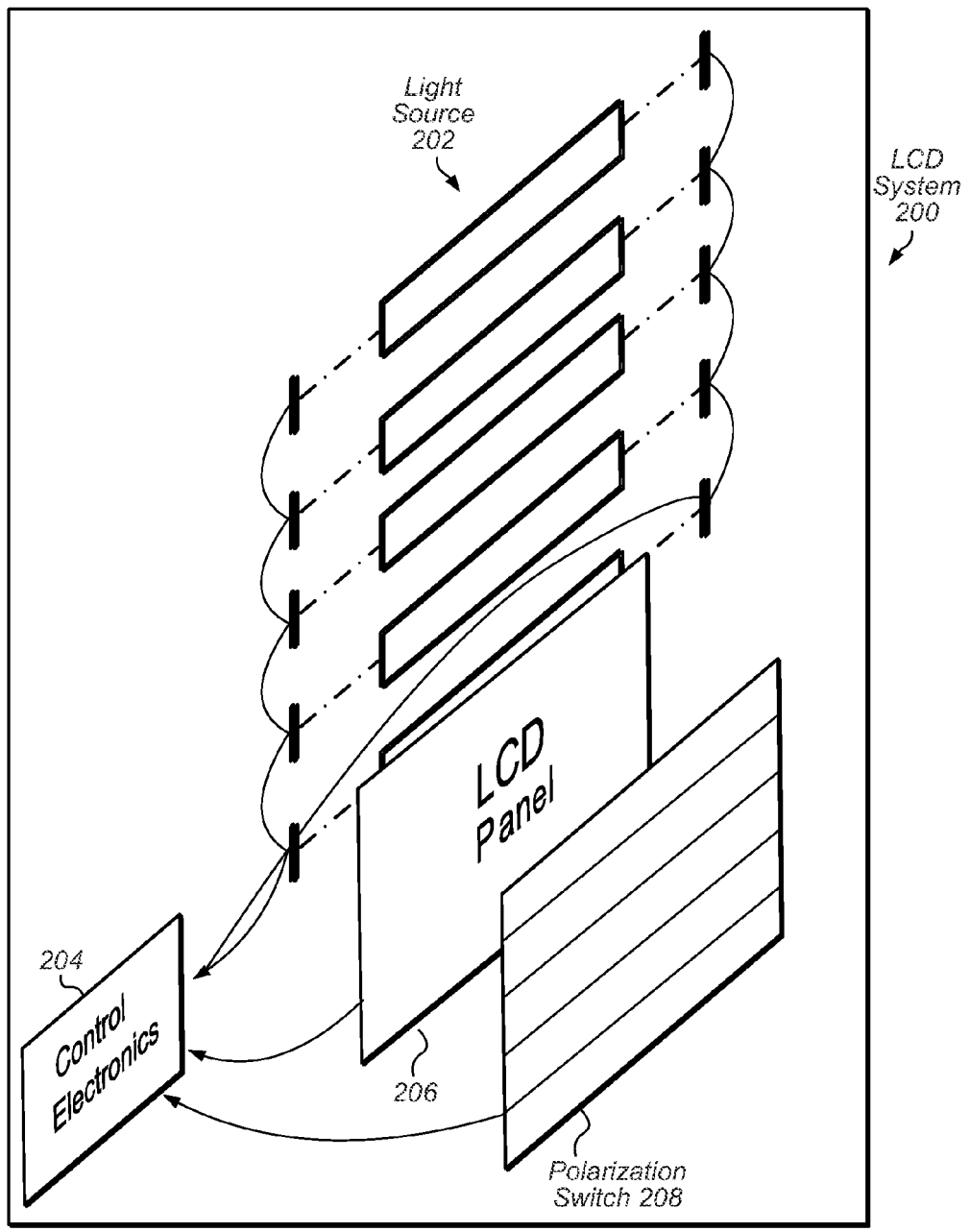
Figure 3:
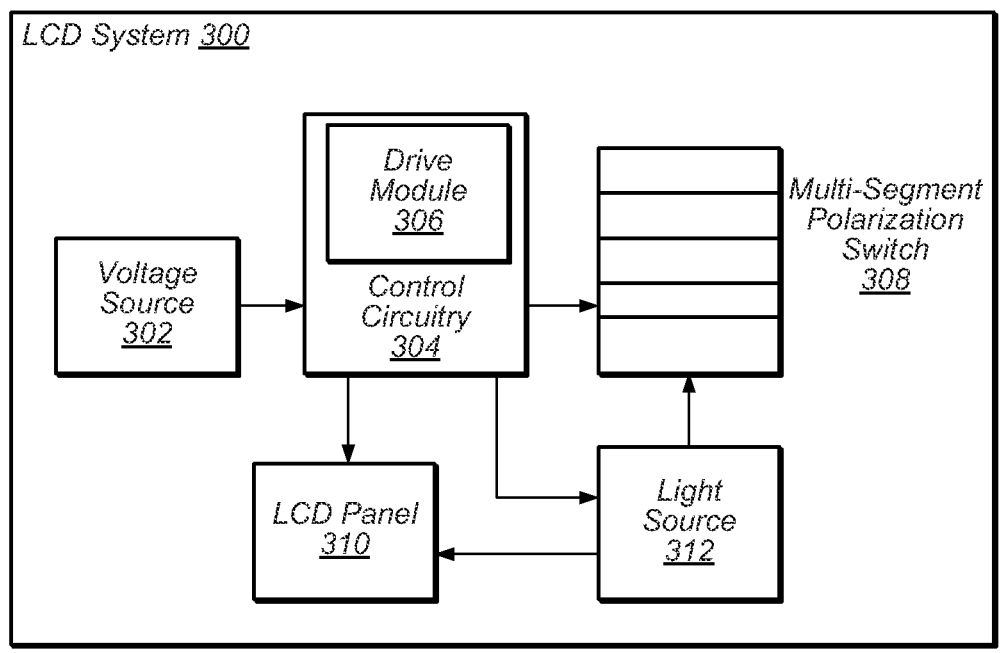
FIG. 3 is a block diagram illustrating one embodiment of a liquid crystal display system that may incorporate a variable drive voltage.

FIGS. 2A, 2B, and 3—Exemplary System

FIGS. 2A and 2B illustrate example liquid crystal display (LCD) systems that may incorporate a variable drive voltage, and which may be configured to perform various embodiments described below. As examples of systems that may incorporate a variable drive voltage, FIG. 2A illustrates an LCD television as well as shutter glasses. The shutter glasses may implement a variable drive voltage or may be standard shutter glasses that may be used with an LCD television that implements the variable drive voltage. Other systems that drive twisted-nematic junctions may also incorporate a variable drive voltage, such as an organic light emitting diode (OLED) system that includes a polarization switch. In one embodiment, LCD system 200 may include light source 202, control circuitry 204, LCD panel 206, and a liquid crystal device, such as polarization switch 208.

In one embodiment, light source 202 may be coupled to control electronics 204, LCD panel 206, and polarization switch 208. Light source 202 may receive power and/or control indications from control circuitry 204. In turn, light source 202 may provide light to LCD panel 206 and polarization switch 208. Light source 202 may be referred to as a backlight. In one embodiment, light source 202 may include a plurality of light emitting diodes (LEDs) that may provide pulses of light to various components of LCD system 200. The backlight may, in various embodiments, be segmented. In one embodiment, the backlight may be segmented into five independently addressable rows. For instance, light source 202 may be segmented into sections that may extend across horizontal bands of the display. The LEDs of light source 202 may pulse at different times, which may be optimized for timing one segment's pulse separate from other segments. Further, a segmented light source 202 may include segmented lightguides that may help minimize row-to-row crosstalk. Light source 202 may be positioned in LCD system 200 behind LCD panel and polarization switch from the perspective of the front of LCD system 200 (where the viewer would be). In one embodiment, the LEDs may be edge LEDs that provide illumination from both sides of LCD system 200. Light source 202 may redirect the illumination from the edge LEDs so that the illumination may be perpendicular to LCD panel 206 and polarization switch 208. LCD system 200 may additionally include an enclosure that may include heatsinks for the LEDs. In that manner, heat produced by the LEDs may be dissipated and alleviate the effects on other LCD system 200 components, such as polarization switch 208. As described herein, light source 202 may be shifted, or extended, in conjunction with the variable drive voltage, according to some embodiments. In an embodiment in which the system is shutter glasses, the shutter glasses may not require any backlight pulsing. As such, an accompanying LCD as part of such a system may include a backlight capable of being pulsed, or in some embodiments, it may include a light source that is incapable of being pulsed (e.g., a CCFL).

In one embodiment, LCD system 200 may include control circuitry 204. Control circuitry 204 may receive a voltage from a voltage source (not shown). Control circuitry 204 may, in turn, provide one or more voltages and/or other indications to light source 202, LCD panel 206, and/or polarization switch 208. As an example, control circuitry 204 may provide a voltage and a backlight enable indication to light source 202, which, in turn, may cause light source 202 to provide a light pulse to LCD panel 206 and polarization switch 208. In one embodiment, control circuitry 204 may independently address different segments of light source 202, LCD panel 206, and polarization switch 208. For example, control circuitry 204 may provide a voltage and a backlight enable indication to a backlight driver board (not shown) of light source 202. Light source 202 may then provided appropriate pulsed voltages to each independently addressable segment of light source 202. In some embodiments, control circuitry 204 may provide a pulsed voltage directly to each segment of LEDs, without necessarily providing the voltage to a backlight driver board. The addressed light source 202 segment may then provide one or more light pulses to LCD panel 206, and polarization switch 208. Control circuitry 204 may include circuitry to implement one or more variable drive voltages to polarization switch 208, according to some embodiments.

LCD panel 206 may include a plurality of pixels that may collectively produce images. The plurality of pixels of the LC panel may be addressed with data that conveys the image to be displayed. In one embodiment, LCD panel 206 may be updated from one frame to the next in a progressive scan manner, and hence updating may not occur all at once. In such an embodiment, the pixels of LCD panel 206 may be updated, for example, sequentially by row from top to bottom. As an example, LCD panel 206 may refresh at a frequency of 120 Hz. For a 120 Hz system, every 8.3 ms the entire panel's data may be updated. The transition from one frame to another may proceed as a progressive scan; the scan may start at the top row, and then proceed through the rest of the rows. In one embodiment, the time difference from updating the top row to updating the bottom row may be approximately 5-6 ms. Accordingly, the scan time to write frame data to LCD panel 206 may take a large portion of each frame. As a result, the portion of each frame where the entire display is in the same state may be minimal. The subsequent frames may be a left eye frame (image) followed by a right eye frame (or vice versa) for a 3D display, or may simply be sequential frames for a 2D display. In one embodiment, backlight and polarization switch segmenting may be applied to maintain synchronization with the progressive scan data write of LCD panel 206. As described herein, an OLED panel may be used in LCD system 200 instead of LCD panel 206 and light source 202. The OLED-based system may likewise benefit from the variable drive techniques described herein. Other imagers, such as a cathode ray tube (CRT), rear projection, or any other imagers may also benefit from the variable drive techniques described herein.

LCD system 200 may include a liquid crystal device, such as polarization switch 208. Polarization switch 208 may use a twisted-nematic liquid crystal mode and may include a plurality of distinct individually addressable elements, called segments. Polarization switch 208 may receive one or more voltages from control circuitry 204 and may receive a light pulse from light source 202. As was the case with light source 202, polarization switch 208 may be segmented into horizontal bands. Polarization switch 208 may be used in LCD system 200 to simultaneously provide a normal black and normal white mode, when used in conjunction with the appropriate eyewear, wherein each eye has the appropriate lens. For instance, in the context of an embodiment using the polarization switch and corresponding eyewear, where the two lenses of the two eyepieces of the eyewear are cross polarized, a normal white mode may be provided in a 3D LCD system 200 for one eye, while concurrently a normal black mode may be provided for the other eye. Polarization switch 208 may control the luminance of LCD system 200. Thus, a normal white mode may allow full luminance in a low voltage state (e.g., 0V) of polarization switch 208 while normal black mode may block all luminance for the corresponding lens of the eyewear. Conversely, a normal white mode may block all luminance in a driven voltage state (e.g., +/−12V), while a normal black mode may allow full luminance for the corresponding lens of the eyewear. Accordingly, in a 3D context, one eye may see an image or frame in a normal white mode while the other eye sees an image or frame in a normal black mode. In one embodiment, where the polarization switch is used in combination with the eyewear, a higher voltage in the driven state may result in a greater drop in luminance in the normal white state. As a result, higher contrast may be achieved with a high voltage, such as +/−12 V, +/−20 V, etc. In some embodiments, polarization switch 208 may be a multi-segment polarization switch, as described herein.

FIG. 3 is a block diagram illustrating one embodiment of the LCD system of FIG. 2, which may be configured to perform various embodiments described below.

In the illustrated embodiment of FIG. 3, LCD system 300 may include voltage source 302, control circuitry 304, liquid crystal devices, such as a polarization switch 308, shown as segments of a multi-segment polarization switch, LCD panel 310, and light source 312. Control circuitry 304 may include drive module 306.

In one embodiment, voltage source 302 may be a power supply for LCD system 300 or may receive one or more voltages from an external power supply. Voltage source 302 may output one or more voltages. The one or more voltages may be provided to control circuitry 304. In some embodiments, voltage source 302 may also provide one or more voltages directly to LCD panel 310, light source 312, a polarization switch 308, or other components (not shown) of LCD system 300. The one or more voltages may be provided to control circuitry 304, and, in turn, to the polarization switch 308, may be a drive voltage. The illustrated embodiment shows control circuitry 304 and voltage source 302 as separate modules, yet, in some embodiments, voltage source 302 may be a subcomponent of control circuitry 304.

In one embodiment, control circuitry 304 may receive the voltage from voltage source 302 and provide a drive voltage to the polarization switch 308. The drive voltage provided to the polarization switch 308 may be provided to a LC addressable element of the polarization switch, or other LC device. In one embodiment, the drive voltage may be +/−12 V. In other embodiments, the drive voltage may be +/−10V, or +/−20 V, for example. In some embodiments, the drive voltage may maintain an overall DC bias of 0V across the LC over time. Control circuitry 304 may include drive module 306. Drive module 306 may include a programmable waveform generator. In one embodiment, drive module 306 may vary the drive voltage it provides to the one or more polarization switches 308 as a function of time. For example, the drive voltage may include a driven function portion and a relaxed function portion. The driven function may correspond to the portion of the drive voltage when transitioning from a low, or relaxed voltage, to a high, or driven voltage. Similarly, the relaxed function may correspond to the portion of the drive voltage when transitioning from a driven voltage to a relaxed voltage. In one embodiment, the driven function may be a normal step function while the relaxed function may be one or more of a number of alternative functions, not equivalent to a step function. In one embodiment, the relaxed function may be continuous, i.e., in an analog manner. For instance, the relaxed function may be a decreasing portion of a Gaussian or cosine function. In some embodiments, the drive voltage function(s) may vary from frame to frame. For instance, LC response time may vary as a function of temperature. Accordingly, control circuitry 304 may include a temperature sensor that may affect the voltage level and/or shape of the drive voltage waveform.

Further, in various embodiments, the relaxed function may rapidly reduce the drive voltage to an intermediate voltage before slowly reducing the drive voltage from the intermediate voltage a relaxed voltage (e.g., 0V, corresponding to the relaxed state). For example, if the driven voltage level is +/−20V, the relaxed function may rapidly reduce the voltage to +/−2V and then slowly reduce the voltage to 0V. Thus, the reduction may occur at different rates, for example a first and second rate, with the second rate being lower than the first rate. In such embodiments, control circuitry 304 may drive the polarization switch 308 at full rate, then transition to a lower intermediate drive voltage in anticipation of the transition to the relaxed state. The intermediate drive voltage may be close to the threshold of the relaxed state, yet the one or more polarization switches may maintain optical properties consistent with the driven state. Maintaining the optical properties consistent with the driven state is used herein to mean that the normal black mode should allow approximately full luminance and the normal white mode should block approximately all luminance. The threshold of the relaxed state may be approximately 1-2V. In one embodiment, the relaxed function may consist of small decremented step functions that approximate a continuous waveform.

In one embodiment, the full reduction from the driven voltage to the relaxed voltage may be sufficiently slow to reduce the optical bounce, yet fast enough to fit within the time constraints of LCD panel 310 updating. For example, for a 120 Hz LCD system, LCD panel 310 may be fully updated or refreshed every 8.333 ms. Thus, the full voltage transition may take less than 8.3 ms in such an example (or in other embodiments, in a time period less than a frame time/period). For instance, for an 8.3 ms frame time, the full voltage transition, from driven to relaxed, may take 3.5 ms +/−1 ms. In other examples (e.g., a 60 Hz or 240 Hz system), panel update time constraints may be different (e.g., 16.667 ms, 4.166 ms). Accordingly, the full voltage transition time may be different as well. In various embodiments, the full voltage transition make take less than 20 ms, 10 ms, 5 ms, 3 ms, etc., depending on various timing considerations. In various embodiments, the full transition from driven state to relaxed state may be performed over a time period greater than 1 is and less than 20 ms.

The drive voltage applied to the polarization switch 308 may present as a variety of different waveforms and timings. For example, the waveform could be an arbitrary descending waveform, a linear descending ramp, or other waveform. Some factors that may be considered in determining the waveform and timing may include: contrast level, the presence of ghosting/crosstalk, balance between left and right eye performance, and color in bright and dark states. In some embodiments, the drive voltage swing and offset may be varied. Further, in some embodiments, the drive voltage may be a pulse-width modulated (PWM) waveform, as described herein.

In one embodiment, different drive voltages may be provided to different segments, of a segmented polarization switch 308. For instance, as described herein, a polarization switch 308 may be segmented into five different segments. A different phase-shifted drive voltage, each of which may have a function (e.g., cosine) applied to the high-low-voltage transition, may be provided to each of the segments. As an example, the provided voltage may be independently driven to provide each segment with an independent and time-shifted voltage from the independently driven voltages being provided to each other segment. In such an embodiment, the timing of the polarization switch transitions may be synchronized with the timing of the backlight pulses and the data of the frames.

In some embodiments, control circuitry 304 may supply one or more voltages and/or other indications to LCD panel 310 and light source 312, in addition to, the one or more polarization switches 308. The voltages may be driven in a different manner than the one or more voltages provided to polarization switches 308. As an example, control circuitry 304 may provide a voltage, and a power-on indication to LCD panel 310 and/or light source 312. Control circuitry 304 may also provide a backlight enable indication to light source 312. Control circuitry 304 may, in some embodiments, receive an indication of data writes to LCD panel 310, from LCD panel 310, or from another source (e.g., an external source such as a set-top box, Ethernet, Wifi, DVD player, Blu-Ray player, etc.). Control circuitry 304 may include circuitry to synchronize the drive voltage to the one or more polarization switches and to left and right frame timing. Control circuitry 304 may further include circuitry to synchronize backlight enable indications with left and right frame timing. Accordingly, the variable drive voltage, described herein, may be used in conjunction with a shifted or extended backlight, to enhance the benefits of the variable drive voltage. The extended backlight may be segmented, where each of the subsidiary segments of the main backlight pulse may be shifted accordingly. In some embodiments, and not shown in FIG. 3, control circuitry 304 may receive video, manipulate and process the video, and provide it to the LCD panel 310. Control circuitry 304 may generate an indication (e.g., Vsync) and data enable indication. The Vsync indication may be used to synchronize timing of the polarization switch and backlight segments, among other components. The data enable indication may indicate when data is written.

In one embodiment, one or more polarization switches 308, or other liquid crystal device with one or more liquid crystal addressable elements, may receive the drive voltage from control circuitry 304 (and drive module 306). As described above, the drive voltage may have a function applied to it before reaching polarization switches 308. In some embodiments, the one or more polarization switches 308 may receive a drive voltage directly from voltage source 302, which may or may not apply a function to the drive voltage. Polarization switches 308 may be a liquid crystal device, such as twisted-nematic panel, homogeneous cells, chiral-homeotropic LC cells, optically compensated birefringence (OCB) cells, pi-cells, etc. Twisted-nematic panels have cells which may twist up to a full 90 degrees in response to a voltage change, to allow varying degrees of light to pass through.

In various embodiments, LCD system 300 may include only a single polarization switch. The polarization switch 308 may cover the entire display of LCD system 300. Accordingly, the single polarization switch 308 may change the polarization state of the light emitted by the display. For a 3D display, this may correspond to two different states: one polarization state that is passed by the right eye polarizer and blocked by the left eye polarizer and another polarization state that is passed by the left eye polarizer and blocked by the right eye polarizer. The polarization switch 308 may be segmented, for example, into horizontal sections, similar to the backlight segmenting described herein. Accordingly, by segmenting the polarization switch into horizontal sections, the correct polarization state may be achieved for corresponding data on LCD panel 310 at a given time. As one example, the polarization switch 308 may be divided into five horizontal sections of equal size. The various segments of polarization switch 308 may be synchronized or timed according to the progressive-scan-based panel write times. In one embodiment, a polarization switch 308 may switch states when the first row of the segment receives new data (i.e., when LCD panel 310 begins to write data to that row).

LCD panel 310 may include a plurality of pixels that may collectively produce images. The plurality of pixels may be addressed with data that may reflect the image to be display. As discussed herein, LCD panel 310 may be updated from one frame to the next in a progressive scan manner and may not occur all at once. In such an embodiment, the pixels of LCD panel 310 may be updated, for example, sequentially by row from top to bottom. As an example, LCD panel 310 may refresh at a frequency of 120 Hz. For a 120 Hz system, every 8.3 ms the entire panel's data may be updated. In one embodiment, the time to update the entire panel, from the top row to the bottom row, may be approximately 5-6 ms. Accordingly, the scan time to write frame data to LCD panel 310 may take a significant time percentage of each frame and the portion of each frame where the entire display is in the same state may likewise be minimal. In one embodiment, backlight and polarization switch segmenting timing and/or segmenting may be applied to maintain synchronization with the progressive scan data write of LCD panel 310.

In one embodiment, LCD system 300 may include a light source 312. Light source 312 may provide an instance (e.g., a pulse) of the light source to the polarization switch 308. Light source 312 may be a backlight, such as incandescent light bulbs, fluorescent lamps, or one or more light emitting diodes (LEDs). Light source 312 may include one or more white backlights or different colored backlights (e.g., RGB LEDs). Light source 312 may be positioned in LCD system 300 behind LCD panel 310 and polarization switch 308 from the perspective of the front of LCD system 300 (where the viewer would be). In one embodiment, the LEDs may be edge LEDs that provide illumination from both sides of LCD system 300. Light source 312 may include a manner in which to redirect the illumination from the edge LEDs so that the illumination may be perpendicular to LCD panel 310 and polarization switch 308.

In some embodiments, light source 312 may pulse twice per frame time (i.e., once for a left eye frame and once for a right eye frame), with each pulse being a pulse of limited duration. For example, starting with a driven state, a first pulse of light source 312 may occur after the drive voltage reduction from the driven state begins. Specifically, in one example, the first pulse may take place during the voltage transition from the driven state to the relaxed state. A second pulse of light source 312 may occur during the relaxed state (i.e., before the drive voltage transitions back to the driven state). In other words, a pulse of the light source, or backlight enable, may be shifted to a later time for the period when the polarization switch drive voltage has a function applied during the high to low voltage transition. In some embodiments, both pulses of a light source in a frame time may be shifted later in time. When both pulses of a light source are shifted later in time, however, the shifted amount may be different for each pulse. For example, the pulse of light source that may occur during the driven-to-relaxed state transition may be shifted 2 ms later in time while the second pulse of a light source in a frame time may be shifted 1 ms later. Therefore, the pulses from light source 312 may not be spaced equally apart from one frame time to the next. An example of unequal spacing between light pulses can be seen below in FIG. 7B. In one embodiment, the backlight may be extended in terms of pulse duration. For example, one pulse of light source 312 may begin before the drive voltage transitions from the driven to the relaxed state but may complete after the voltage transition is complete. Thus, elaborating on the example, if a light pulse is typically 2 ms, then extending the light pulse may increase its duration to 3 ms. Extending or shifting the backlight may enable more of the data of LCD panel 310 to be in a steady, same state for a frame and a polarization switch 308 to be in an appropriate state when the backlight is enabled. When used in conjunction with the variable drive voltage, in which optical bounce may be minimized, shifting the backlight into the minimal optical bounce period may produce only a minimal amount of light leakage in the normal white state and a minimal drop in luminance for the normal black state. In some embodiments, the time difference between the start of the first pulse of limited duration and the start of the second pulse of limited duration in a frame may be less than the time difference from the start of the voltage reduction to the start of the voltage return to the driven level.

Light source 312 may, in various embodiments, be segmented. In one embodiment, the backlight may be segmented into five independently addressable rows. For instance, light source 312 may be segmented into sections that may extend across horizontal bands of the display. The LEDs of light source 202 may pulse at different times, which may be optimized for timing one segment's pulse separate from other segments. Further, a segmented light source 202 may include segmented lightguides that may help minimize row-to-row crosstalk. As described herein, the backlight may be shifted later in time. Light contamination may extend into the optical bounce area but may not have significant effects in terms of light leakage and luminance drops in normal white and normal black modes, respectively.

Figure 5:
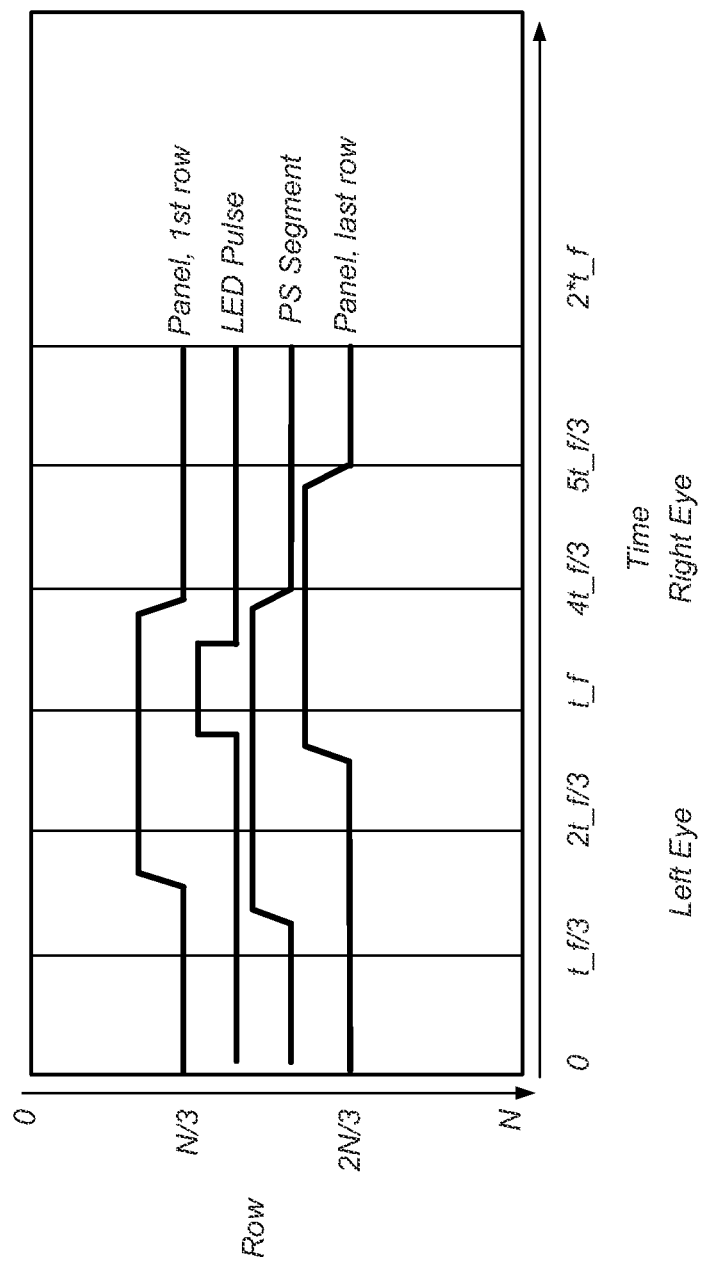
FIG. 5 is a timing diagram of a section of an LCD system, according to some embodiments.
Figure 6:
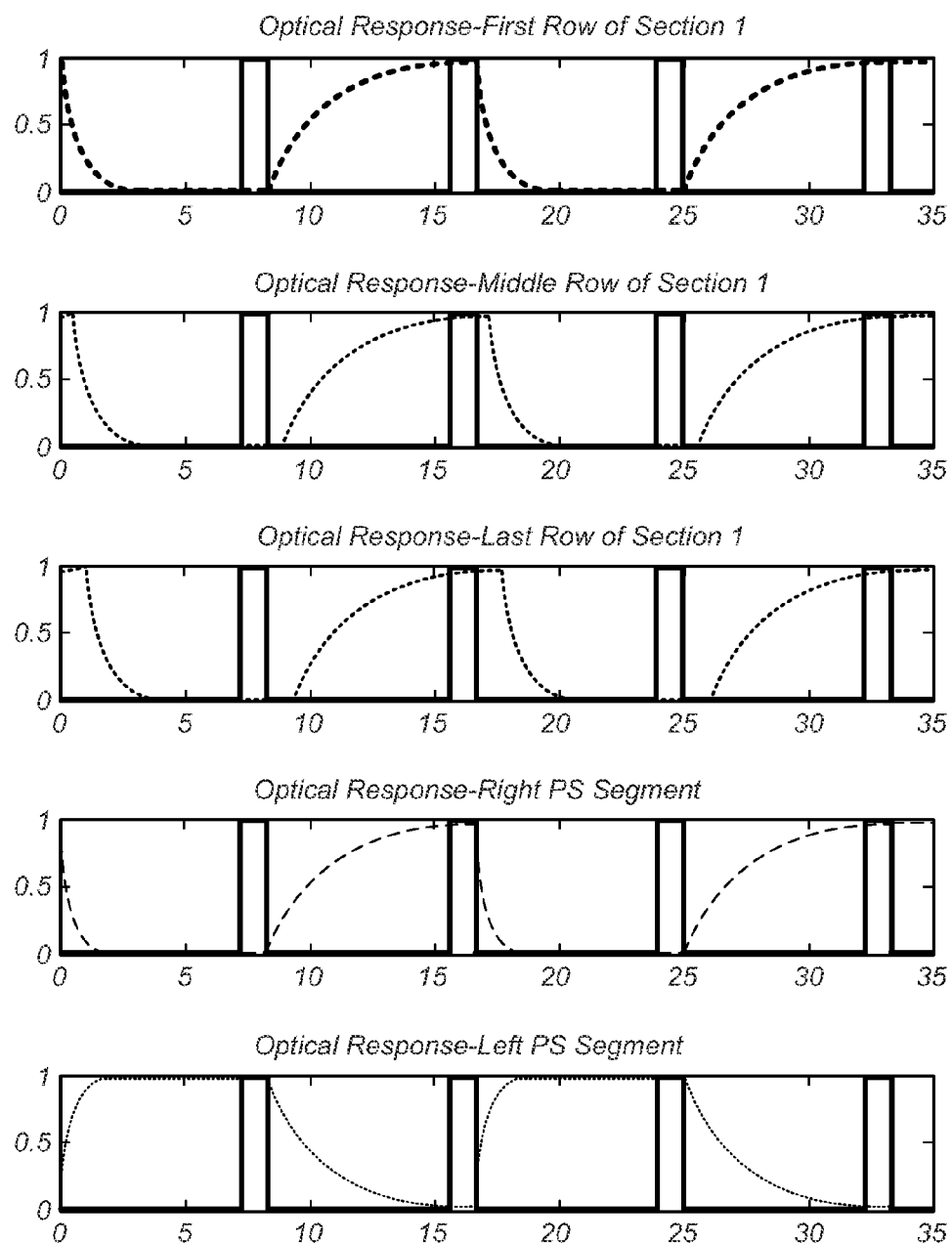
FIG. 6 is a diagram of optical responses of an LCD panel and polarization switch, according to some embodiments.

FIGS. 5 and 6 illustrate examples of timing and optical response according to the LCD system of FIGS. 2-3. FIG. 5 is one example of a timing diagram of a section of an LCD system, according to some embodiments. For example, FIG. 5 may be the timing for segment 2 of a segmented polarization switch. For ease of explanation, the backlight is not shown segmented but may be segmented in some embodiments. FIG. 5 shows the 1st row and last row of the LCD panel being written. The segment as active for the left eye frame at a time between the two panel writes. Active may correspond to 0 V for a normal white mode or a driven voltage (e.g., +/−12 V) for a normal black mode. In addition, the LED pulse is near the end of the active segment state to allow more LCs to settle. FIG. 6 is a diagram of optical responses of an LCD panel and polarization switch, according to some embodiments. The top 3 portions of FIG. 6 correspond to the optical response of the LCD at different rows of a section of the LCD. Note the slight phase shift in the data write from first row to last row. This corresponds to the progressive scan data write. In the bottom two figures, the optical response of the polarization switch, as viewed through right and left eyewear is shown. The optical responses demonstrate a reduced area of cross-talk, which may result from the variable drive voltage techniques described herein. Note that the shapes of the waveforms in FIG. 5 may not be an accurate representation of the actual waveforms used in various embodiments.

Turning back to FIG. 3, one or more components of LCD display 300 may, in some embodiments, be implemented by a computer-readable storage medium, memory, or some other component. A computer-readable storage medium may be one embodiment of an article of manufacture that stores instructions that are executable by a processor. As an example, a computer-readable storage medium can be used to store instructions read by a program and used, directly or indirectly, to fabricate hardware for control circuitry 304, described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may include a set of gates (e.g., defined in a synthesis library), which represent the functionality of control circuitry 304. The netlist may then be placed and routed to produce a data set describing geometric shapes to be applied to masks. The masks may then be used in various semiconductor fabrication steps to produce a semiconductor circuit or circuits corresponding to control circuitry 304.

In some embodiments, LCD system 300 may not include LCD panel 310 or light source 312. Instead, LCD system may include an organic light emitting diode (OLED) panel. In an OLED-based LCD system 300, all rows of the panel may be written simultaneously (i.e., not in a progressive scan manner). In such an embodiment, segmenting may not be used. Instead of using a backlight, control circuitry 304 may pulse the OLED panel itself. Further, the variable drive voltage of control circuitry 304 may be used with the OLED-based LCD system 300, in a similar manner, which may reduce the optical bounce and therefore maximize the amount of steady state time of the display, among other benefits.

Using a variable drive voltage may increase frame utilization by reducing optical bounce and accelerating the transition between the driven and relaxed states. This may be valuable in minimizing cross-talk (ghosting) in 3D displays by increasing the duration of steady state time in the optical response of the polarization switch. In addition, by accommodating a higher drive voltage, a brighter, higher contrast 3D display may be achieved. Further, by shifting the backlight enable later in time, the LCD pixels may further stabilize before the backlight is applied, which may also reduce the ghosting effect. Segmenting the backlight may further enhance the benefits of the variable drive voltage. This may minimize the momentary reduction the amount of light transmitted (on the order of nits) in the polarization switch normal black state. It may also minimize light leakage in the normal white state, in what should be a no or low luminance state.

Figure 4:
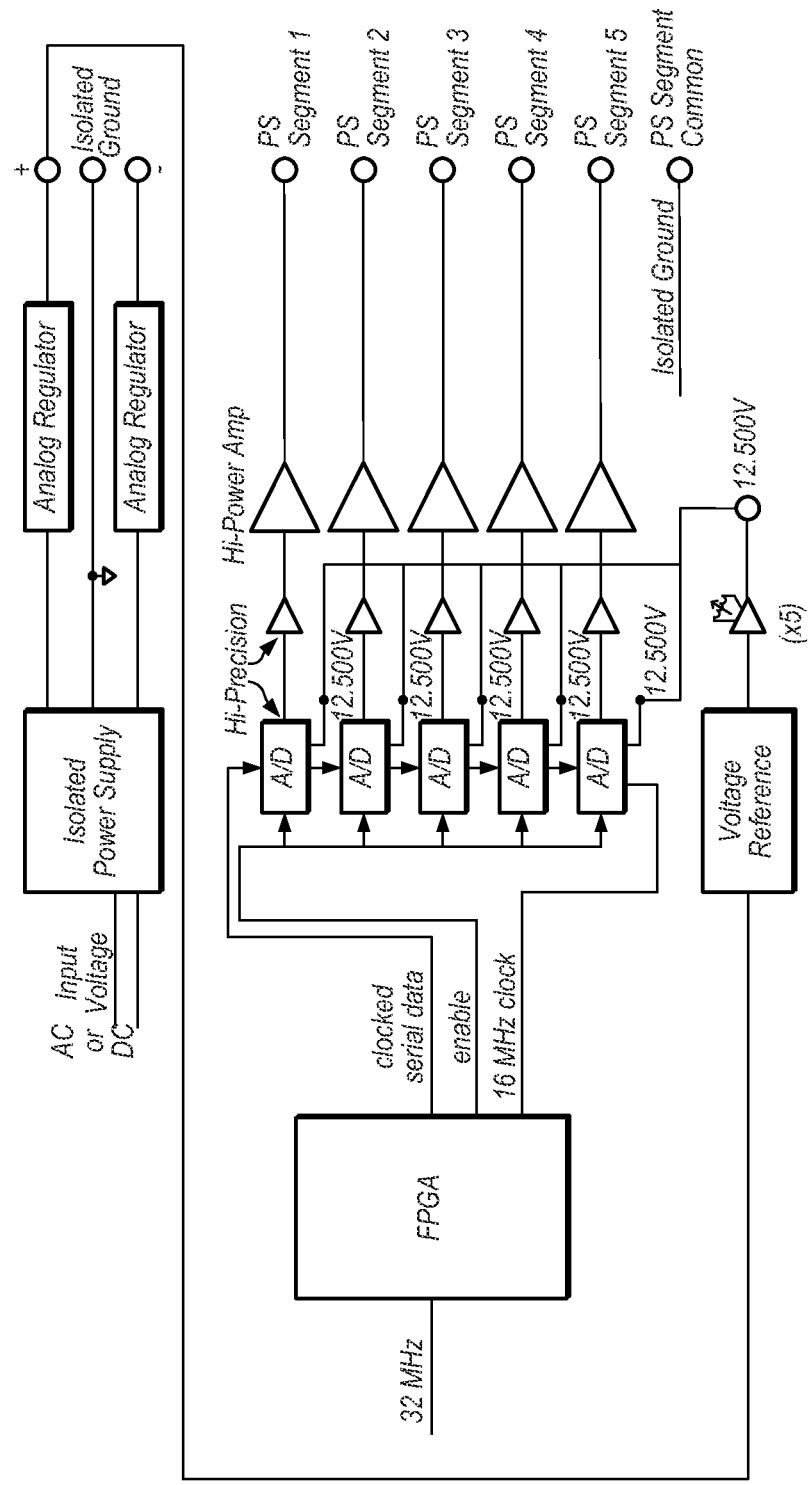
FIG. 4 illustrates one example of variable drive voltage circuitry, according to some embodiments.

FIG. 4—Exemplary Drive Voltage Module

FIG. 4 illustrates an example of a drive module, according to some embodiments. The example implementation of drive module 306 in FIG. 4 illustrates a polarization switch that is segmented into five different segments. The isolated power supply may receive an input voltage, which may be an AC or DC input voltage. The input voltage may be from a power supply for the entire LCD system or from another source. Isolated power supply may output a positive and negative voltage as well as an isolated ground. The isolated ground may be a common ground for the segments. The positive and negative voltages may be processed by an analog regulator before being provided to a voltage reference. This may provide a clean voltage to voltage reference such that downstream circuitry may receive a clean voltage as well. Voltage reference may output one or more voltages that may be provided to one or more variable gain amplifiers and, in turn, provided to one or more A/D converters. In the embodiment shown, voltage reference may output five voltages (one for each of the five segments in this example), each of which may be provided to a different variable gain amplifier and a different A/D converter.

In the embodiment shown, a system clock may be provided to a field-programmable gate array (FPGA). For example, a 32 MHz system clock may be provided to the FPGA to drive discrete values to the one or more A/D converters. The FPGA may include a function, such as a cosine or Gaussian among other functions, embedded in the FPGA table. Discrete values from the table may be taken over time, which may produce the function. In one embodiment, voltage increments may be based on a 25 V swing over $2^{16}$ bits. The FPGA may output a plurality of digital commands (e.g., clocked serial data, and enable) to each of the A/D converters. The clocked serial data and enable digital commands may be common between the various A/D converters or may be unique commands for each A/D converter. In other words, the FPGA may output five clocked serial data digital commands and five enable commands, with one serial data command and one enable command being provided to each A/D converter. In one embodiment, FPGA may provide a common clocked serial data digital command to the A/D converters and a separate enable digital command for each A/D converter. The enable commands may be staggered in accordance with the polarization switch segmentation scheme, described herein. For example, the voltage transitions of one segment may occur at different times than the voltage transitions of the other segments. Accordingly, the enable indications may likewise occur at different times. FPGA may also provide a clock to the A/D converters. In the illustrated example, the clock may be a 16 MHz clock.

Each A/D converter may receive the digital commands and the clock from the FPGA as well as the reference voltage, shown here at 12.5 V. In one embodiment, the A/D converters may be 18-bit high precision A/D converters. Each A/D converter may convert the input analog voltage into a discrete representation of that voltage. The discrete representation of the voltage may then be provided to a high-precision buffer (e.g., 18 bit) and a hi-power amplifier and, ultimately, to one of the segments of the polarization switch. The illustrated example shows a single polarization switch segmented into five segments. Each segment may receive a separate drive voltage, which may be phase shifted compared to the drive voltages of the other segments. The signals in the illustrated example are bipolar signals that may allow arbitrary positive and negative waveforms. The illustrated example is also high speed meaning greater than 888 KHz per segment.

FIGS. 5 and 6—Timing and Optical Response of Example LCD System

FIGS. 5 and 6 illustrate examples of timing and optical response according to the LCD system. FIGS. 5 and 6 are described in further detail in connection with the description of LCD system 300.

Figure 7A:
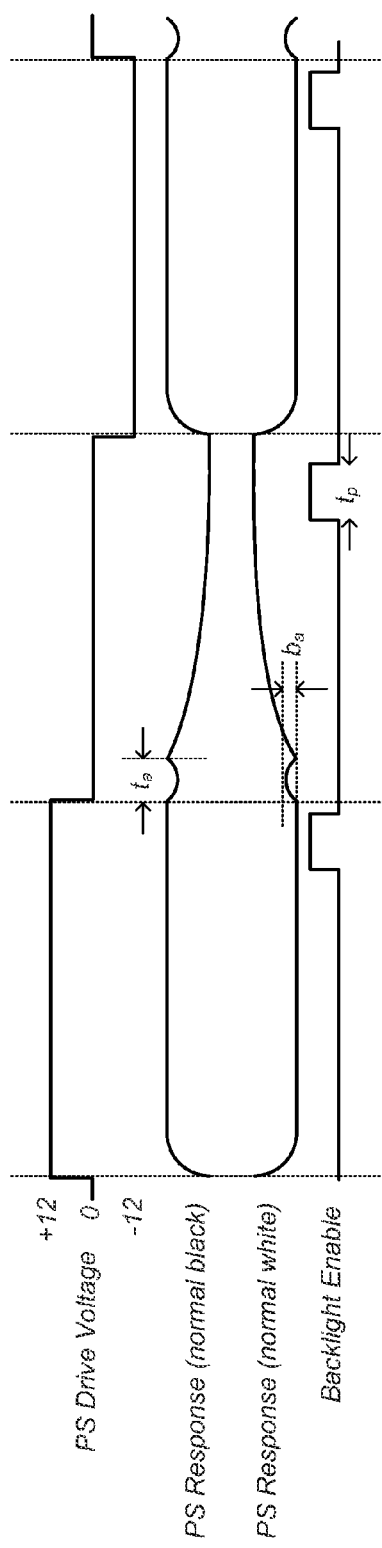
FIG. 7A is a timing diagram of a typical optical bounce.
Figure 7B:
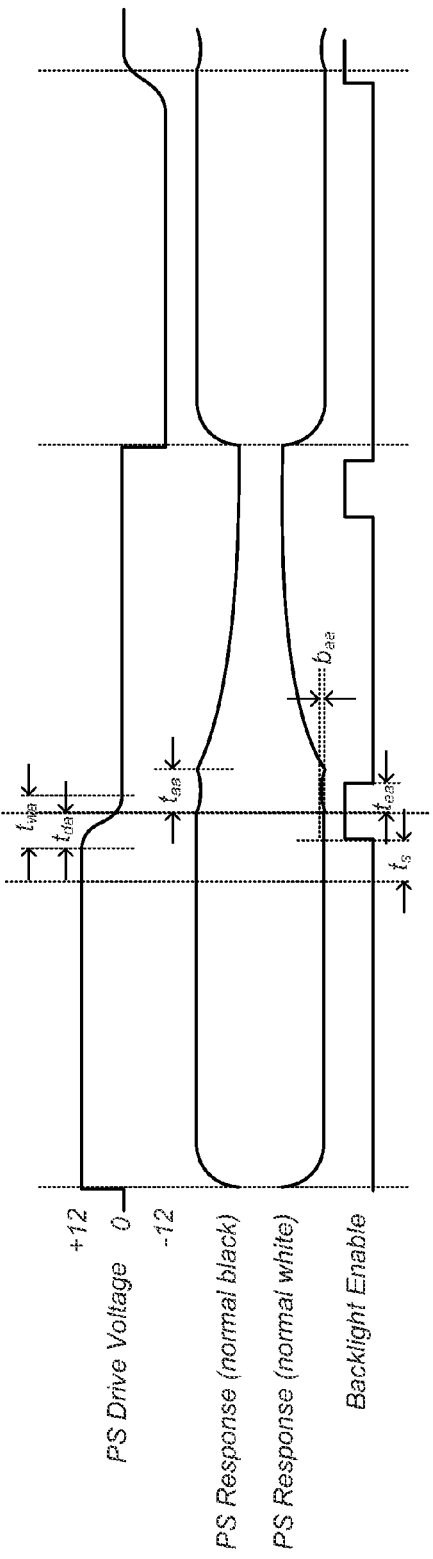
FIG. 7B is a timing diagram showing a reduced optical bounce, according to some embodiments.
Figure 8:
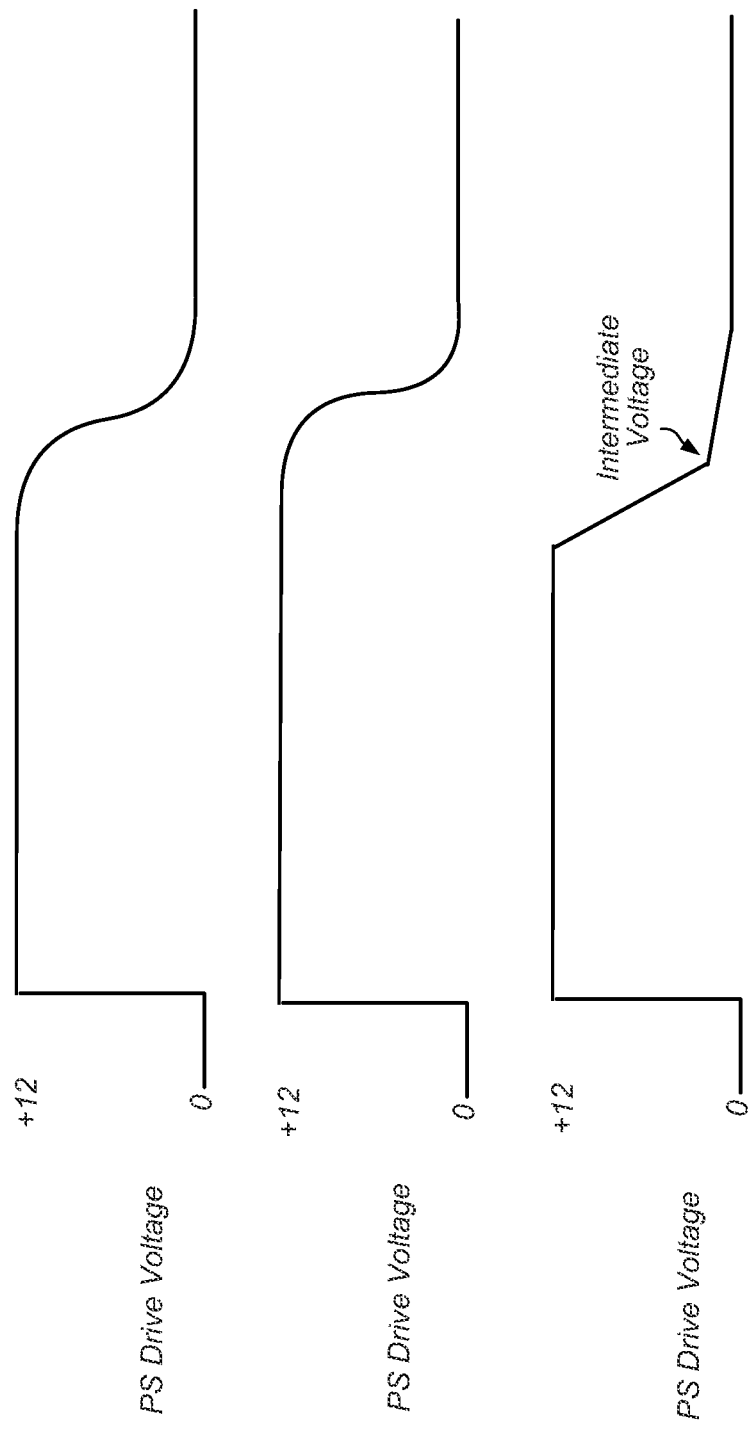
FIG. 8 illustrates example variable drive voltages, according to some embodiments.

FIGS. 7A, 7B, and 8—Timing Diagrams

FIG. 7A is a timing diagram of a typical optical bounce that does not use a variable drive voltage while FIG. 7B is a timing diagram showing a reduced optical bounce, according to some embodiments.

The following table includes example values for the various times and other values in the two figures:

| | | |
|---|---|---|
| $t_a$ = 1.5 ms +/− .5 | $t_{da}$ = 2 ms | $t_{aa}$ = 1.5 ms +/− .5 |
| $t_p$ = 1-2 ms | $t_{ea}$ = 6 ms +/− 2 | $t_s$ = 1.5 ms +/− .5 |
| $b_a$ = 10% norm +/− 2% | $t_{wa}$ = 3.5 ms +/− 1 | $b_{aa}$ = 4% norm |

FIG. 7A illustrates a drive voltage according to a step function and corresponding transmittance-time curves. As shown, the step function applies to both transitions, driven to relaxed state and relaxed to drive state. In one embodiment, for example for a 3D LCD system, one portion of a frame may produce an image for one eye and the next portion of a frame may produce an image for the other eye. In the figures, the normal black PS response may correspond to the luminance for one eye and the normal white PS response may correspond to the luminance for the other eye. When the voltage is driven to the driven state, the luminance for the normal black eye may be high while the luminance for the normal white eye may be low. The opposite is true for a low voltage; the luminance for the normal white eye is high and the luminance for the normal black eye is low. Note the slow change in optical response when the voltage transitions abruptly from the high voltage state to the low voltage state. In addition, note the optical bounce in both PS responses. The bounce occurs in FIG. 7A at a time $t_a$ approximately 1 ms after the voltage transition. The bounce represents dead time that adds delay to the system and negatively affects optical properties of the display (e.g., leakage in a black state or drops in luminance in a white state). The leakage in luminance in the normal white mode when it is supposed to be black may be very noticeable to a viewer of the display. In this example, $b_a$ is approximately 10% of peak normal white luminance, at a time when the normal white mode should be near 0% luminance. The drop in luminance in the normal black mode may not be as significant to a viewer but is still shown in FIG. 7A. Further, the backlight enable in FIG. 7A is a 1-2 ms pulse, represented by $t_p$. The pulses from frame time to frame time are approximately equally spaced apart, about 8.3 ms apart for a 120 Hz display, which corresponds to the frame time of the display. The first and third pulses (and subsequent odd pulses) in the example correspond to frames for the normal black eye and the second pulse (and subsequent even pulses) correspond to frames for the normal white eye. The pulses may occur a short period before each transition from driven to relaxed state, and a short period before each transition from relaxed to driven state.

FIG. 7B illustrates a drive voltage and corresponding transmittance-time curves, with a continuous function applied to the driven to relaxed state portion of the drive voltage. In the illustration, the continuous function is a 3.5 ms wide cosine function with a zero point 0.5 ms beyond the relaxed step function (of FIG. 7A) zero point. The optical bounce in FIG. 7B represents only a bounce of 4% ($b_{aa}$) of the peak normal white luminance—a more than double reduction over FIG. 7A. This may increase the steady state of the PS responses as compared to FIG. 7A. By reducing the optical bounce, the backlight enable may be shifted into the optical bounce period. In other words, the luminance may be sufficiently low such that some of the time within that period may actually be reclaimed, in some embodiments, by allowing some backlight pulsing in this period of time. By shifting the backlight enable into what was the optical bounce period, the LCs may be more stabilized at the time the backlight is enabled. As a result, greater image quality (e.g., reduced ghosting/crosstalk, increased contrast, etc.) may be achieved. The results may be further enhanced by segmenting the one or more polarization switches and backlight, as described herein. In the case where the backlight is segmented, subsidiary pulses of the main backlight pulse may extend into the optical bounce period resulting in an even lesser amount of light leakage. In the example shown, the backlight enable is shifted approximately 1.5 ms later in time in FIG. 7B.

FIG. 8 illustrates various example drive voltage curves, according to embodiments. For example, the top curve illustrates a drive voltage curve with the transition from driven to relaxed state performed according to a cosine function. The middle curve illustrates a driven to relaxed state transition according to a Gaussian function while the bottom curve illustrates a curve according to a first rate and a second rate, with the first rate being a more rapid voltage drop than the second rate. The indicated intermediate voltage may be the transition point between the first rate and the second rate. The polarization switch may maintain an optical property of the driven state at the intermediate voltage.

Figure 9:
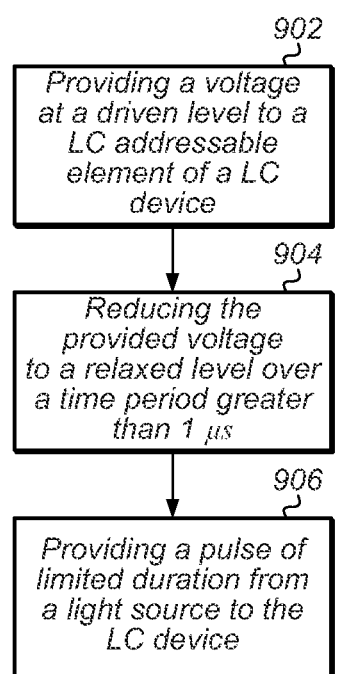
FIG. 9 is a flowchart diagram illustrating one embodiment of a variable drive voltage.

FIG. 9—Driving a Voltage of a Polarization Switch

FIG. 9 illustrates a method 900 for driving a voltage of a polarization switch 308. The method shown in FIG. 9 may be used in conjunction with any of the systems or devices shown in the above figures, among other devices. In various embodiments, some of the method elements shown may be performed concurrently, in a different order than shown, or may be omitted. In some embodiments, method 900 may include additional (or fewer) blocks than shown. For example, in some embodiments, only blocks 902 and 904 may be used while in others, all illustrated blocks may be used. As shown, method 900 may operate as follows.

At 902, a voltage may be provided to a liquid crystal addressable element of a liquid crystal device, such as a polarization switch, to a driven voltage level. The driven voltage level may represent a driven state. For example, the provided voltage may be +/−12 V. In one embodiment, the voltage may be provided by voltage source 302 directly to polarization switch 308. In one embodiment, the voltage may be generated by voltage source 302, modified or passed on by control circuitry 304 and/or drive module 306, and then provided to the liquid crystal element of the liquid crystal device, such as polarization switch 308. The portion of the drive voltage that drives polarization switch 308 to the driven state may be performed according to a step function. Polarization switch 308 may be a liquid crystal cell device, such as a twisted-nematic device that may include one or more liquid crystal addressable elements. The liquid crystal addressable elements are defined herein as regions of an LC device that can be independently controlled (e.g., electronically). For an LCD, the liquid crystal addressable element may be a pixel, and for a multi-segment polarization switch, the liquid crystal addressable element may be a segment. For a multi-segment polarization switch, the provided voltage may be independently driven to provide each segment with an independent and time-shifted voltage. In some embodiments, the LC device may use a TN LC mode.

At 904, the provided voltage may be reduced to a relaxed level (e.g., 0 V) over a period of time greater than 1 μs. A voltage reduction approximately equivalent to a step function would take less than 1 μs and other functions taking less than 1 μs may be seen by the LC device as equivalent to a step function. In some embodiments, the full reduction from driven to relaxed level may take less than 20 ms. For example, the transition for a 120 Hz LCD system may take approximately 3.5 ms. In various embodiments, drive module 306 may apply a relaxed function to the drive voltage it provides to polarization switch 308. The relaxed function may be a continuous function, such as the decreasing portion of a cosine or Gaussian. The relaxed function may cause the voltage to decrease as a function of time until reaching the relaxed state. In some embodiments, the provided voltage function may be a PWM waveform function. In some embodiments the relaxed function over time may include a voltage rise, provided the total relaxed voltage function occurs within the window of 20 us to 20 ms.

At 906, after the voltage reduction begins, a light pulse of limited duration may be provided to the LC device, such as polarization switch 308 and/or LCD panel 310. In one embodiment, the pulse of light source 312 may be a pulsed backlight that may be enabled during a continuous transition from the driven state to the relaxed state. In some embodiments, the pulse of light source 312 during this transition may be extended such that the pulse extends later into a period where the cells may be more stable. In other words, the pulse of light source 312 may extend into the time period coincident with the optical bounce period. Light source 312 may be segmented to extend into the optical bounce period. For a next frame, the voltage provided to the polarization switch may be returned to a driven state. Before the voltage is returned to the driven state, another pulse of limited duration of light source 312 may be enabled and provided to polarization switch 308. The time difference between the start of the first pulse of limited duration in a frame and the second pulse of limited duration may be less than the time difference from the start of the voltage reduction to the start of the voltage return to the driven level. The pulse of light source 312 during the driven state may correspond to a portion of a frame for one eye (in a 3D display) and the second pulse, during the relaxed state, may correspond to a second portion of a frame for the other eye. Or, they may correspond to subsequent frames in a 2D display. In general the light pulses may be approximately equally spaced apart. By shifting the first pulse of the light source into the time period coincident with the optical bounce period, it allows the second pulse to be shifted as well. As shown in FIGS. 7A-7B, the response of the relaxed state may take a long time to stabilize, therefore shifting the light pulse later into the relaxed state period allows for more stable LCs before the light is applied to them. As a result, cross-talk may be reduced. In one embodiment, the timing and duration of light pulses may vary depending on the drive function's waveform and timing. One embodiment may include applying a different portion (e.g., increasing portion) of the same waveform to the driven state.

In a system that uses a segmented polarization switch, the method of 900 may be used for each segment of the polarization switch. This may create a phase-shifted variable drive voltage for the various segments of the polarization switch and enable the polarization switch segments to be synchronized with data writing of the panel. Likewise, the pulse of limited duration may be divided into a plurality of subsidiary pulses that may be provided to corresponding segments of the polarization switch.

The method of FIG. 9 could also be applied in situations other than an LCD system. For example, method 900 may apply equally as well to an OLED-based system. An OLED-based system may not require a separate light source or and LCD panel. Instead, the OLED panel may be pulsed itself, that is, the duty cycle of on-pixels to off-pixels may be short. In any event, an OLED-based system may benefit from the disclosed variable drive voltage techniques. Further, the method may apply to more than just polarization switches, such as other applications using a TN device. For example, method 900 could be applied to shutter glasses. For example, shutter glasses may be used as a switch, in which case, the disclosed techniques may offer similar benefits to those gained by a polarization switch. Each eyepiece of the shutter glasses may be an LC shutter, which may have similar time constraints to the LCD system.

The above blocks of method 900 may be initiated by a processor, processors, a CPU, a memory, a computer-readable storage medium, other hardware, or any combination thereof.

By transitioning the voltage of polarization switches from a driven state to a relaxed state in a continuous, analog way, optical bounce may be minimized. Further, delay as a result of the voltage transition may also be minimized and therefore allow a longer steady state period for the LCs. This may provide additional time for LCD pixels to stabilize before the light source is enabled. This may reduce ghosting and may reduce the amount of light that may be transmitted in an off-state due to any remaining optical bounce.

Figure 10:
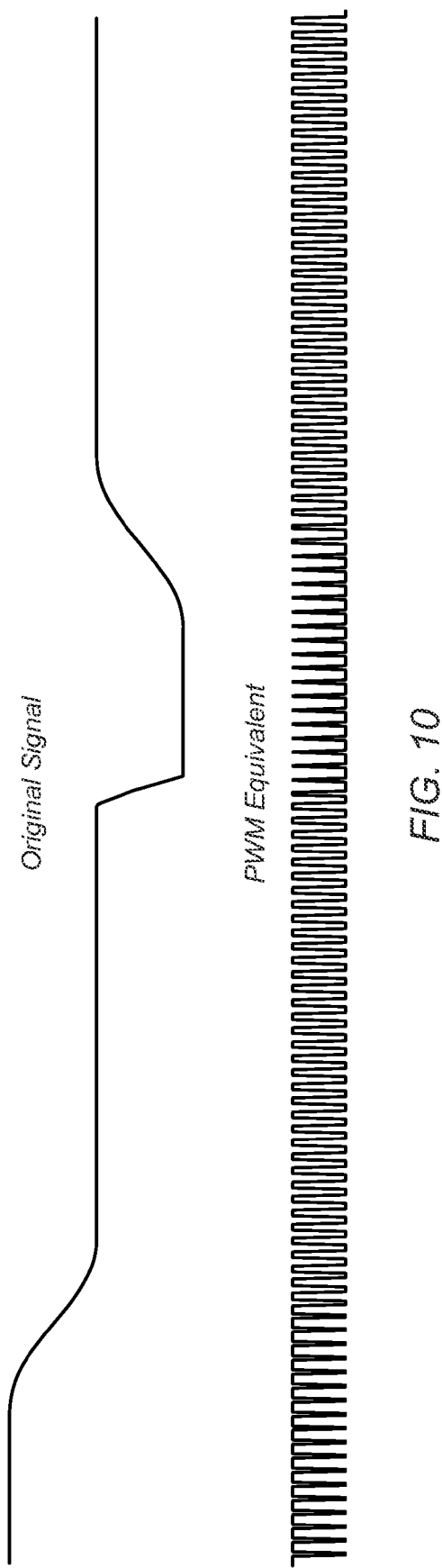
FIG. 10 illustrates another embodiment of a variable drive voltage, according to some embodiments.

FIG. 10 illustrates an alternate embodiment of a variable drive voltage. The top waveform shows an analog voltage that may be applied to a liquid crystal device, such as a polarization switch. The waveform may be a direct representation of how the polarization switch is excited (driven).

The bottom waveform is the PWM equivalent of the top waveform. PWM is a completely digital technique that varies the pulse width to correspond to a particular RMS voltage. Note that on the left side, the PWM waveform is mostly "high", representing a higher RMS voltage. In the 2nd part and the 4th part of the waveform (the flat part) note that the PWM duty cycle is 50%—that part of the waveform represents half the maximum voltage. Finally, in the 3rd part of the waveform, note that the pulses are narrow, which represents lower RMS voltages.

In one implementation, the PWM signal may be low-pass filtered to better approximate the target waveform. A low-pass filter may be implemented by utilizing the R-C characteristics of the polarization switch itself, which may allow the polarization switch to be directly driven from an entirely digital source.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a multi-segment polarization switch, comprising:
    when the multi-segment polarization switch is at a relaxed voltage,
        providing to each segment of the multi-segment polarization switch a drive voltage function independent and time-shifted from a drive voltage function being provided to each other segment, wherein for each segment, the drive voltage function is a discontinuous function that drives the segment from the relaxed voltage to a driven voltage; and
    when the multi-segment polarization switch is at the driven voltage,
        providing to each segment of the multi-segment polarization switch a relax voltage function independent and time-shifted from a relax voltage function being provided to each other segment, wherein for each segment, the relax voltage function is a continuous function that drives the segment from the driven voltage to the relaxed voltage by reducing provided voltage in a continuous manner that results in a reduced optical bounce of the segment.

2. The method of claim 1, wherein the discontinuous function is a step function.

3. The method of claim 1, wherein the continuous function is a decreasing portion of a Gaussian or cosine function.

4. The method of claim 1, wherein the drive voltage function and the relax voltage function are varied from frame to frame.

5. The method of claim 1, further comprising:
    when the multi-segment polarization switch is at a relaxed voltage,
        providing light to the multi-segment polarization switch via a first light pulse during a transition from the relaxed voltage to the driven voltage; and
    when the multi-segment polarization switch is at a drive voltage,
        providing light to the multi-segment polarization switch via a second light pulse during a transition from the driven voltage to the relaxed voltage.

6. The method of claim 5, wherein each pulse results in a plurality of subsidiary pulses that are provided to corresponding segments of the multi-segment polarization switch.

7. The method of claim 1, wherein the multi-segment polarization switch uses a twisted-nematic (TN) liquid crystal mode.

8. A system comprising:
    a liquid crystal (LC) display, wherein the LC display comprises a multi-segmented polarization switch; and
    a voltage source configured to:
        when the multi-segment polarization switch is at a relaxed voltage,
            apply to each segment of the multi-segment polarization switch a drive voltage function independent and time-shifted from a drive voltage function being applied to each other segment, wherein for each segment, the drive voltage function is a discontinuous function that drives the segment from the relaxed voltage to a driven voltage; and
        when the multi-segment polarization switch is at the driven voltage,
            apply to each segment of the multi-segment polarization switch a relax voltage function independent and time-shifted from a relax voltage function being applied to each other segment, wherein for each segment, the relax voltage function is a continuous function that drives the segment from the driven voltage to the relaxed voltage by reducing provided voltage in a continuous manner that results in a reduced optical bounce of the segment.

9. The system of claim 8, wherein the discontinuous function is a step function.

10. The system of claim 8, wherein the continuous function is a decreasing portion of a Gaussian or cosine function.

11. The system of claim 8, wherein the voltage source is further configured to vary the drive voltage function and the relax voltage function from frame to frame.

12. The system of claim 8, further comprising a light source configured to provide light to the multi-segment polarization switch, wherein the light source is a backlight that is configured to:
    when the multi-segment polarization switch is at a relaxed voltage,
        provide light to the multi-segment polarization switch via a first light pulse during a transition from the relaxed voltage to the driven voltage; and
    when the multi-segment polarization switch is at a drive voltage,
        provide light to the multi-segment polarization switch via a second light pulse during a transition from the driven voltage to the relaxed voltage.

13. The system of claim 12, wherein the light source is a segmented backlight, wherein each pulse of the light source results in a plurality of subsidiary pulses that are provided to corresponding segments of the multi-segment polarization switch.

14. The system of claim 8, wherein the multi-segment polarization switch uses a twisted-nematic (TN) liquid crystal mode.

15. A non-transitory computer readable memory medium storing program instructions executable by a processor to:
    when a multi-segment polarization switch is at a relaxed voltage,
        apply to each segment of the multi-segment polarization switch a drive voltage function independent and time-shifted from a drive voltage function being applied to each other segment, wherein for each segment, the drive voltage function is a discontinuous function that drives the segment from the relaxed voltage to a driven voltage; and when the multi-segment polarization switch is at the driven voltage, apply to each segment of the multi-segment polarization switch a relax voltage function independent and time-shifted from a relax voltage function being applied to each other segment, wherein for each segment, the relax voltage function is a continuous function that drives the segment from the driven voltage to the relaxed voltage by reducing provided voltage in a continuous manner that results in a reduced optical bounce of the segment.

16. The non-transitory computer readable memory medium of claim 15, wherein the discontinuous function is a step function.

17. The non-transitory computer readable memory medium of claim 15, wherein the continuous function is a decreasing portion of a Gaussian or cosine function.

18. The non-transitory computer readable memory medium of claim 15, wherein the voltage source is further configured to vary the drive voltage function and the relax voltage function from frame to frame.

19. The non-transitory computer readable memory medium of claim 15, wherein the program instructions are further executable by a processor to:

when the multi-segment polarization switch is at a relaxed voltage, provide light to the multi-segment polarization switch via a first light pulse from a light source during a transition from the relaxed voltage to the driven voltage; and when the multi-segment polarization switch is at a drive voltage, provide light to the multi-segment polarization switch via a second light pulse from the light source during a transition from the driven voltage to the relaxed voltage.

20. The non-transitory computer readable memory medium of claim 19, wherein each pulse results in a plurality of subsidiary pulses that are provided to corresponding segments of the multi-segment polarization switch.

* * * * *